United States Patent [19]
Yanagi et al.

[11] Patent Number: 5,889,379
[45] Date of Patent: Mar. 30, 1999

[54] STEPPER MOTOR CONTROL SYSTEM WHICH USES PULSE FREQUENCIES THAT VARY ACCORDING TO A NON-LINER CURVE

[75] Inventors: Haruyuki Yanagi, Machida; Makoto Kawarama, Kawasaki; Masaya Shinmachi, Kawasaki, all of Japan

[73] Assignee: Canon Kabushiki Kaisha, Tokyo, Japan

[21] Appl. No.: 886,893

[22] Filed: Jul. 2, 1997

[30] Foreign Application Priority Data

Jul. 8, 1996 [JP] Japan ................... 8-197044
Jan. 23, 1997 [JP] Japan ................... 9-024310

[51] Int. Cl.$^6$ ....................................... H02P 8/00
[52] U.S. Cl. ............................ 318/696; 318/254
[58] Field of Search ................... 318/696, 685, 318/254, 701, 138

[56] References Cited

U.S. PATENT DOCUMENTS

| | | | |
|---|---|---|---|
| 3,806,821 | 4/1974 | Niemeyer et al. | 327/114 |
| 4,286,202 | 8/1981 | Clancy et al. | 318/696 |
| 4,648,026 | 3/1987 | Petrick | 364/174 |
| 4,714,867 | 12/1987 | Palmin et al. | 318/696 |
| 5,262,708 | 11/1993 | Metzger | 318/685 |
| 5,274,316 | 12/1993 | Evans et al. | 318/696 |
| 5,574,351 | 11/1996 | Jacobson et al. | 318/696 |

FOREIGN PATENT DOCUMENTS

| | | |
|---|---|---|
| 63-059797 | 3/1988 | Japan . |
| 07245993 | 9/1995 | Japan . |

OTHER PUBLICATIONS

Lies, et al. "Digital Control For Stepper Motor Functions", Elec. Engr., vol. 68, No. 829, 1 Jan. 1996, p. 32 XP00550294.

*Primary Examiner*—Jonathan Wysocki
*Attorney, Agent, or Firm*—Fitzpatrick, Celia, Harper & Scinto

[57] ABSTRACT

A stepping motor control system for a recording apparatus which uses a stepping motor as a driving source of a carriage with a recording head, has a stepping motor driving circuit for exciting the phases of the stepping motor, and a control circuit for transferring data corresponding to a predetermined stepping motor driving curve to the driving circuit, so as to easily obtain a stepping motor driving curve that can suppress vibrations, and the driving curve is formed from an Nth-order specific formula having two or more inflection points.

6 Claims, 7 Drawing Sheets

STEPPER MOTOR CONTROL SYSTEM WHICH USES PULSE FREQUENCIES THAT VARY ACCORDING TO A NON-LINER CURVE

BACKGROUND OF THE INVENTION

1. Field of the Invention

The present invention relates to a stepping motor control system suitable for driving, e.g., a carriage of a recording apparatus.

2. Related Background Art

In recent years, stepping motors are popularly used as driving sources for industrial equipment since they have high rotational positioning precision. Among industrial equipment, stepping motors are popularly used as driving motors for so-called OA equipment.

In recording apparatuses as well, stepping motors are often used as driving sources of carriages with recording heads. Upon driving a carriage, a stepping motor is normally used in the slew section outside the self-activation section. Hence, the stepping motor is made to rise at a low frequency in the self-activation section, and accelerated to a predetermined use frequency. To stop the stepping motor, the stepping motor is decelerated from the predetermined use frequency, and made to fall to the low frequency in the self-activation section. The above-mentioned driving method is normally used in a stepping motor for driving a carriage. As such frequency vs. time acceleration/deceleration curve of the stepping motor, a linear curve, exponential function curve, S-shaped curve, and the like are normally used since they have high torque characteristics and vibration characteristics. Furthermore, in order to improve the vibration characteristics and the like in a limited arrangement, for example, a control method of supplying a pulse with a long duration that deviates from the predetermined acceleration/deceleration curve during acceleration is used.

However, since the S-shaped driving curve is calculated from a higher-order (third-order or higher) equation, elaborate and time-consuming calculations are required. Furthermore, innumerable curves are available depending on the portions of the curve to be used as the driving curve, how a large number of variables and parameters are set, and the like. Also, calculations and confirmation of such variable, parameters, and the like require much labor. On the other hand, a manual input method that does not use any equations requires much labor due to repeated trials and errors. For the above-mentioned reasons, demand has arisen for a method that can easily form a good driving curve within a short period of time.

SUMMARY OF THE INVENTION

The present invention has been made in consideration of the above situation and has as its object to easily derive a good driving curve for a stepping motor.

It is another object of the present invention to define a good driving curve for a carriage driving stepping motor by an Nth-order specific formula having two or more inflection points.

It is still another object of the present invention to derive a good driving curve by using a start frequency, predetermined frequency, and the number of ramp-up pulses in the Nth-order specific formula.

It is still another object of the present invention to set one inflection point of the driving curve of the stepping motor upon rising at a start frequency, and another inflection point at a predetermined frequency.

It is still another object of the present invention to set one inflection point of the driving curve of the stepping motor upon falling at a predetermined frequency, and another inflection point at a stop frequency.

DESCRIPTION OF THE PREFERRED EMBODIMENTS

The preferred embodiments of the present invention will be described hereinafter with reference to the accompanying drawings.

First Embodiment

Figure 1:
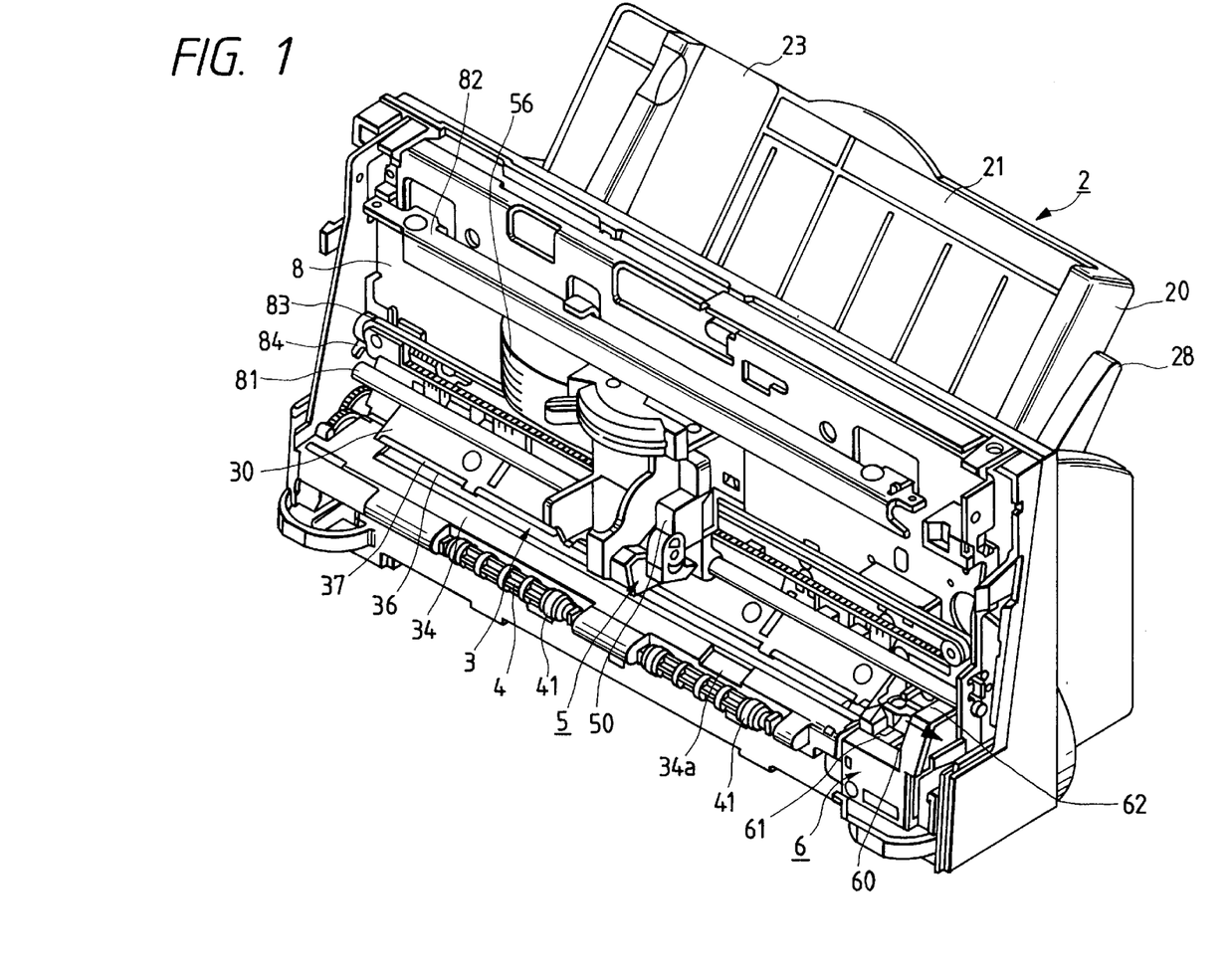
FIG. 1 is a perspective view showing the overall arrangement of a recording apparatus according to the present invention.
Figure 2:
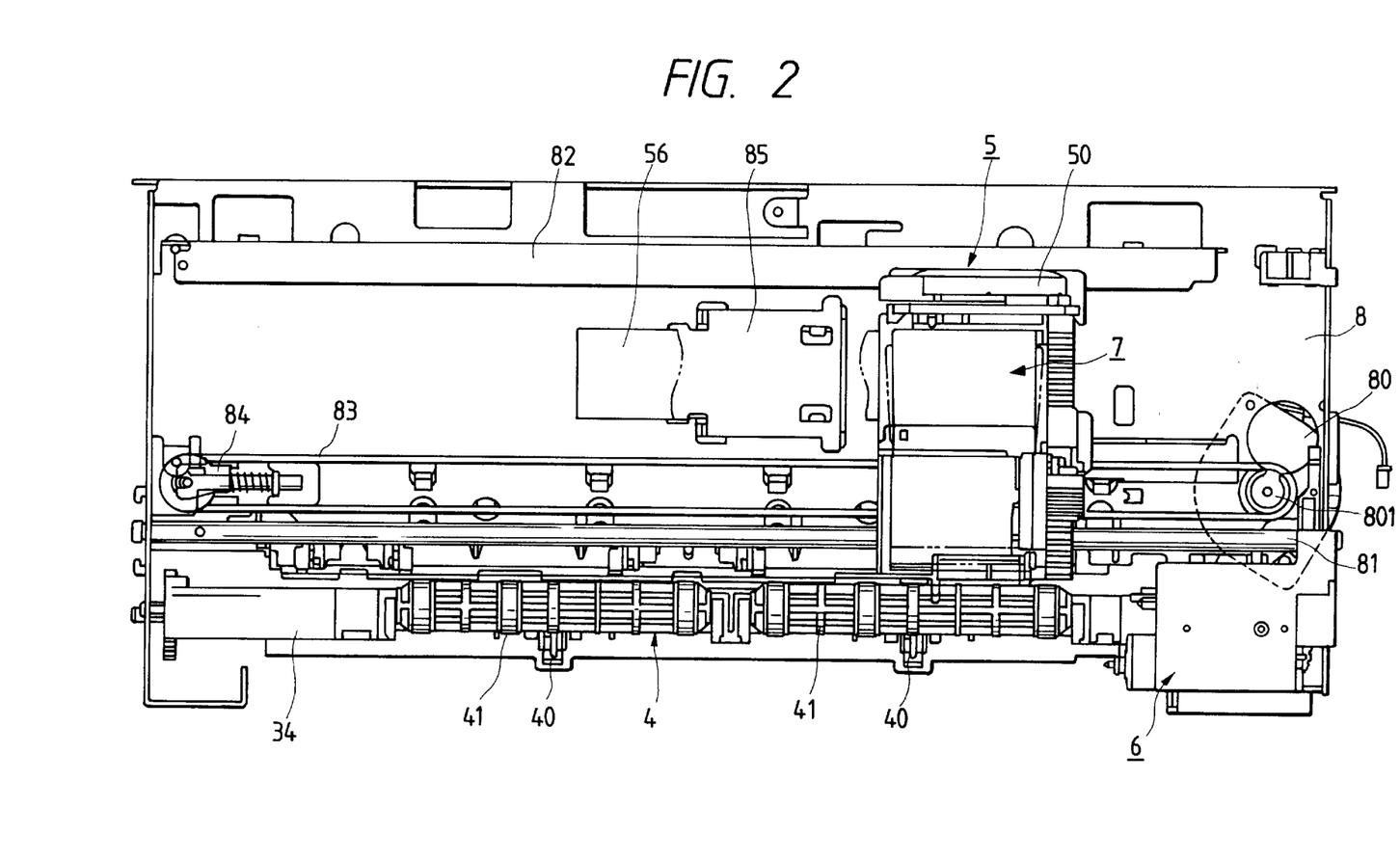
FIG. 2 is a front view of the recording apparatus shown in FIG. 1.
Figure 3:
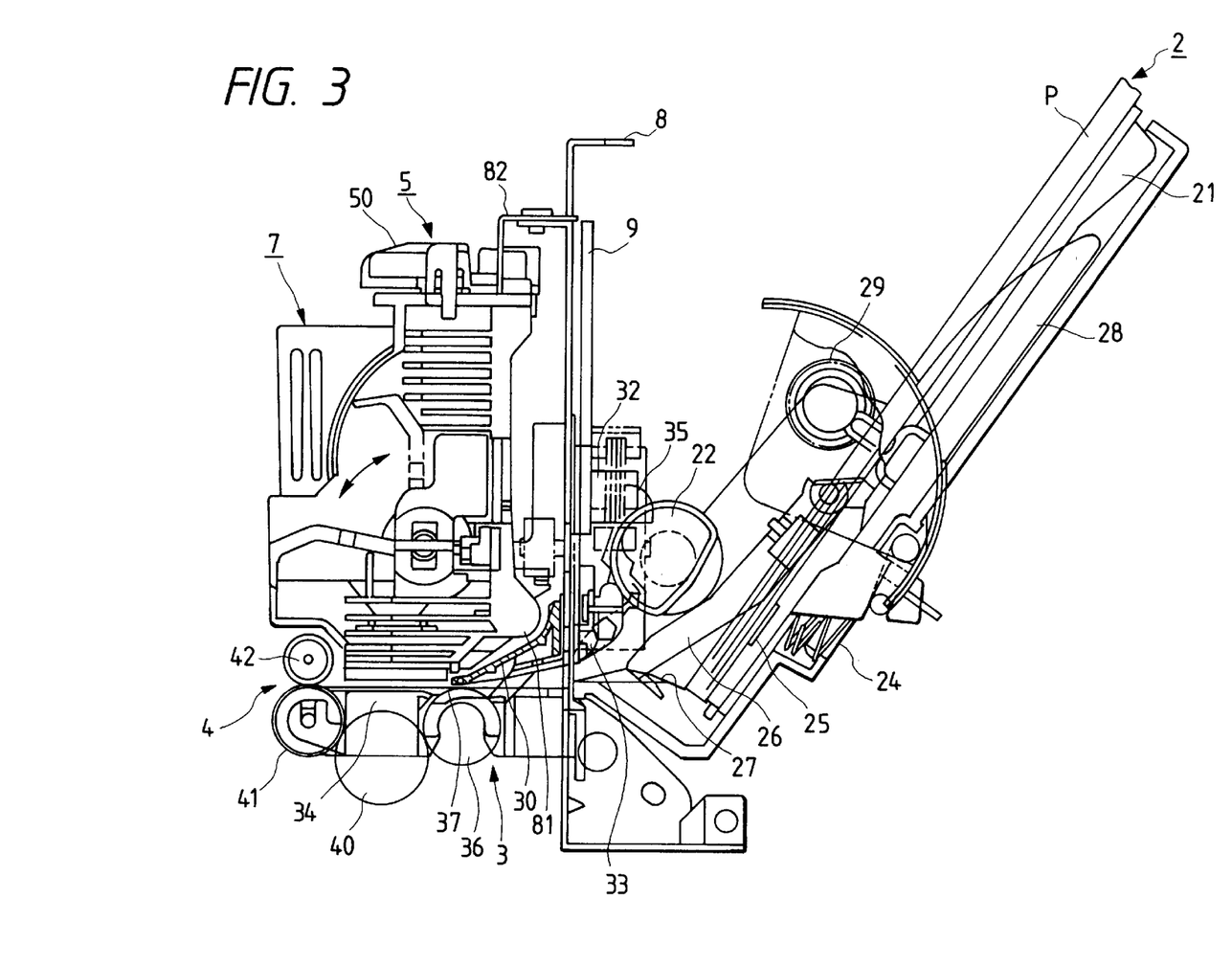
FIG. 3 is a sectional view of the recording apparatus shown in FIG. 1.

A stepping motor driving device according to the first embodiment of the present invention will be described below with reference to FIGS. 1 to 4, 5A to 5F and 6. A stepping motor is used as a driving source of a recording apparatus which prints by scanning a carriage with a head. A recording apparatus 1 with an automatic sheet feeder comprises a sheet feed unit 2, a sheet convey unit 3, a sheet discharge unit 4, a carriage unit 5, and a cleaning unit 6. These units will be briefly described in turn below. Note that FIG. 1 is a perspective view showing the overall arrangement of the recording apparatus 1, FIG. 2 is a front view of the recording apparatus 1, and FIG. 3 is a sectional view of the recording apparatus 1.

(A) Sheet Feed Unit

In the sheet feed unit 2, a pressure plate 21 that stacks sheet members P and a feed rotary member or roller 22 are attached to a base 20. A movable side guide 23 is movably arranged on the pressure plate 21 to restrain the stacking position of the sheet members P. The pressure plate 21 is rotatable about a rotation shaft connected to the base 20, and is biased toward the feed roller 22 by a pressure plate spring 24. A separation pad 25 such as artificial skin or the like which consists of a member with a large coefficient of friction and prevents double feeding of the sheet member P is arranged at the position of the pressure plate 21 that opposes the feed roller 22.

Furthermore, the base has a separation pawl 26 that covers a corner portion of the sheet member P in one direction to separate the sheet member P one by one, a bank portion 27 which is formed integrally with the base 20 to separate a sheet member such as a thick paper sheet for which the separation pawl 26 cannot be used, a selector lever 28 which is switched between the normal paper position and the thick paper position, so that the separation pawl 26 effects at the normal paper position, and does not effect at the thick paper position, and a release cam 29 which releases the contact state between the pressure plate 21 and the feed roller 22.

In the above-mentioned arrangement, in a standby state, the release cam 29 presses the pressure plate 21 down to a predetermined position. At this position, the contact state between the pressure plate 21 and the feed roller 22 is released. In this state, when the driving force of a convey roller 36 is transmitted to the feed roller 22 and the release cam 29 via a gear and the like, since the release cam 29 leaves the pressure plate 21, the pressure plate 21 moves upward, and the feed roller 22 comes into contact with the sheet member P. Upon rotation of the feed roller 22, the sheet member P is picked up and begins to be fed. The sheet member P is separated by the separation pawl 26 one by one, and is fed to the sheet convey unit 3. The feed roller 22 and the release cam 22 rotate until they feed the sheet member P into the sheet convey unit 3, and then resume the standby state in which the contact state between the sheet member P and the feed roller 22 is released again, thus disconnecting the driving force from the convey roller 36.

(B) Sheet Convey Unit

The sheet convey unit 3 has the convey roller 36 for conveying the sheet member P and a PE sensor 32. The convey roller 36 is in contact with a driven pinch roller 37. The pitch roller 37 is held by a pinch roller guide 30, and is biased by a pinch roller spring 31 to be in press contact with the convey roller 36. The pitch roller 37 is in press contact with the convey roller 36, thereby producing a convey force for the sheet member P. Furthermore, an upper guide 33 and a platen 34 which guide the sheet member P are arranged at the entrance of the sheet convey unit 3 that receives the sheet member P.

The upper guide 33 has a PE sensor lever 35 for informing the PE sensor 32 of detection of the leading and trailing ends of the sheet member P. Furthermore, a recording head 7 for forming an image on the basis of image information is arranged on the downstream side of the convey roller 36 in the sheet convey direction.

In the above-mentioned arrangement, the sheet member P fed to the sheet convey unit 3 is guided by the platen 34, pinch roller guide 30, and upper guide 33, and is fed to a pair of rollers, i.e., the convey roller 36 and the pinch roller 37. At this time, the PE sensor lever 35 detects the leading end of the conveyed sheet member P, thereby obtaining the print position of the sheet member P. The sheet member P is fed along the platen 34 when the pair of rollers 36 and 37 are rotated by an LF motor (not shown).

Note that the recording head 7 uses an ink-jet recording head that integrates an ink tank, and allows easy exchange. The recording head 7 applies heat to ink using heaters and the like. The ink causes film boiling by the heat, and is ejected from nozzles 70 of the recording head 7 by changes in pressure by growth or shrinkage of a bubble produced by the film boiling, thereby forming an image on the sheet member P.

(C) Carriage Unit

The carriage unit 5 has a carriage 50 to which the recording head 7 is attached. The carriage 50 is supported by a guide shaft 81 for reciprocally scanning the carriage in a direction perpendicular to the convey direction of the sheet member P, and a guide rail 82 that holds the rear end of the carriage 50 to maintain a gap between the recording head 7 and the sheet member P. Note that the guide shaft 81 and the guide rail 82 are attached to a chassis 8. The carriage 50 is driven by a carriage motor 80 attached to the chassis 8 via a timing belt 83. The timing belt 83 is extended and supported by an idle pulley 84. Furthermore, the carriage 50 has a flexible board 56 for supplying a head signal from an electrical circuit board 9 to the recording head 7.

In the above-mentioned arrangement, when an image is to be formed on the sheet member P, the pair of rollers 36 and 37 convey the sheet member P to the row position to be subjected to image formation (the position in the convey direction of the sheet member P), and the carriage motor 80 moves the carriage 50 to the column position to be subjected to image formation (the position perpendicular to the convey direction of the sheet member P), so that the recording head 7 faces the image forming position. Thereafter, the recording head 7 ejects ink toward the sheet member P in accordance with signals from the electrical circuit board 9, thereby forming an image.

(D) Sheet Discharge Unit

In the sheet discharge unit 4, a transmission roller 40 contacts the convey roller 36, and also contacts a discharge roller 41. Hence, the driving force of the convey roller 36 is transmitted to the discharge roller 41 via the transmission roller 40. A spur 42 contacts the discharge roller 41 so as to be driven by it. With the above-mentioned arrangement, the sheet member P on which an image is formed by the carriage unit 5 is clamped and conveyed in the nip between the discharge roller 41 and the spur 42, and is discharged onto a discharge tray (not shown) or the like.

(E) Cleaning Unit

The cleaning unit 6 has a pump 60 for cleaning the recording head 7, a cap 61 for avoiding the recording head 7 from drying, and a drive selection arm 62 for selectively the driving force from the convey roller 36 to the sheet convey unit 2 and the pump 60. When the drive selection arm 62 is set at a position other than the sheet convey or cleaning position, since a planetary gear (not shown) that rotates about the shaft of the convey roller 36 is fixed to a predetermined position, no driving force is transmitted to the sheet convey unit 2 and the pump 60. When the carriage 50 moves the drive selection arm 62 in the direction of an arrow A by its movement, the planetary gear becomes free and moves in correspondence with the forward/reverse rotation of the convey roller 36. When the convey roller 36 rotates in the forward direction, the driving force is transmitted to the sheet convey unit 2; when the roller 36 rotates in the reverse direction, the driving force is transmitted to the pump 60.

Figure 4:
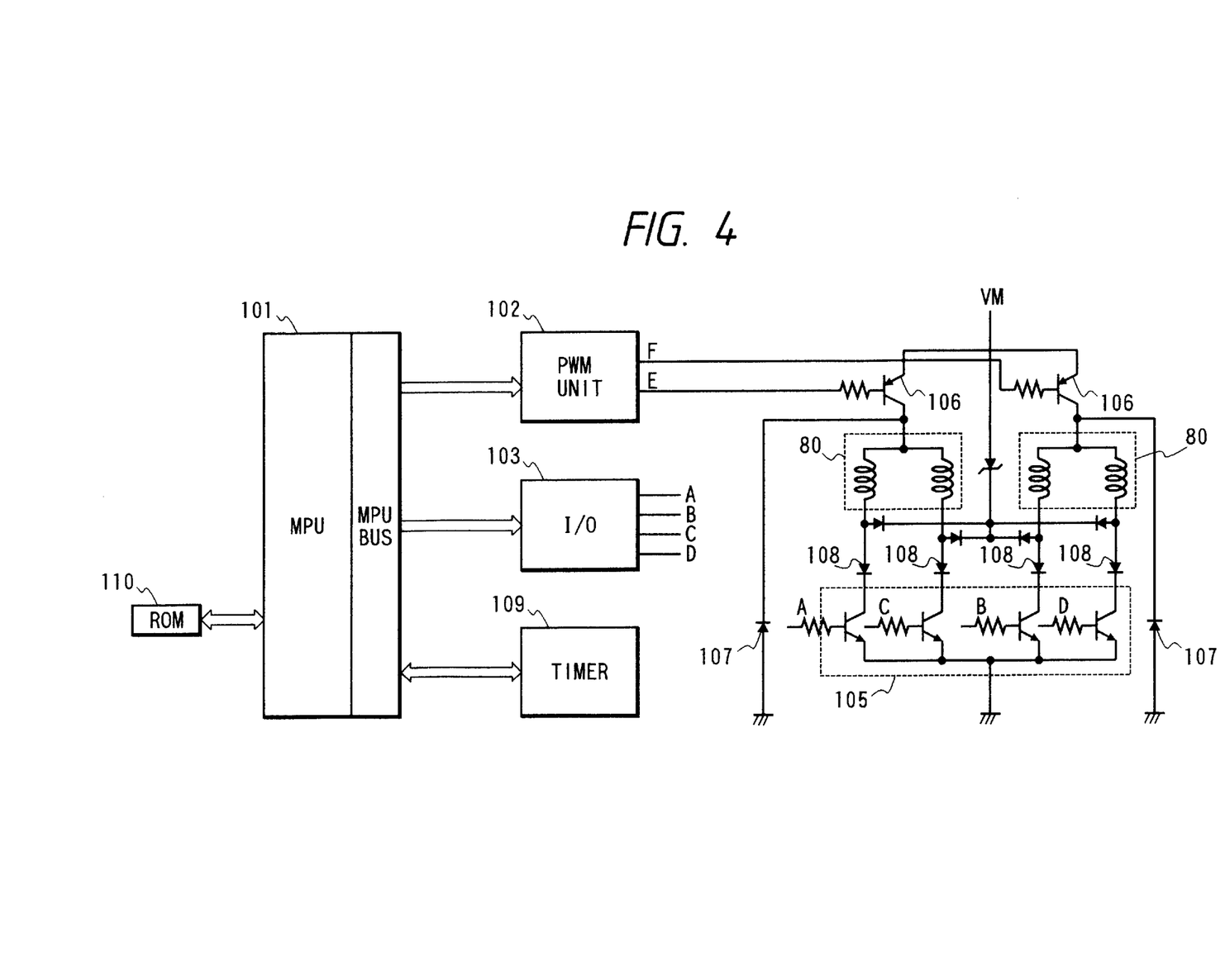
FIG. 4 is a diagram of a block circuit of a driving device for a stepping motor as a driving source of a carriage shown in FIG. 1.
Figure 5A:
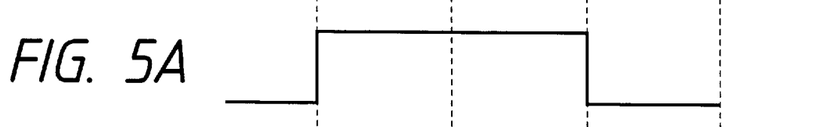
FIGS. 5A, 5B, 5C, 5D, 5E and 5F are timing charts of the block circuit of the driving device of the stepping motor shown in FIG. 4.
Figure 5B:
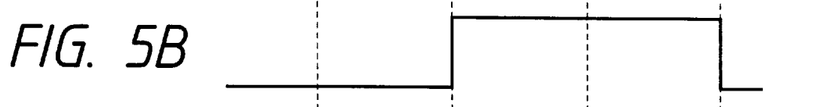
Figures 5C, 5D:
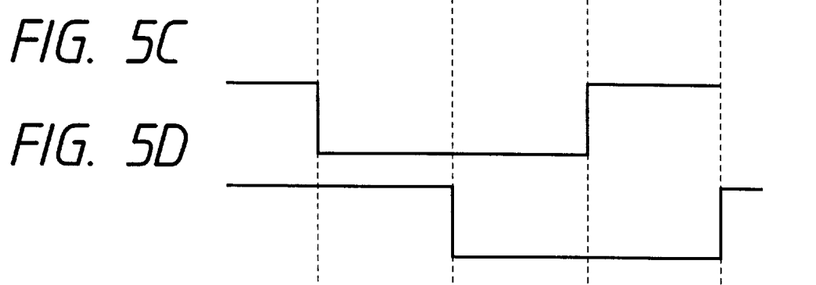
Figure 5E:
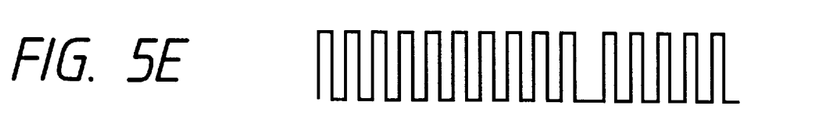
Figure 5F:
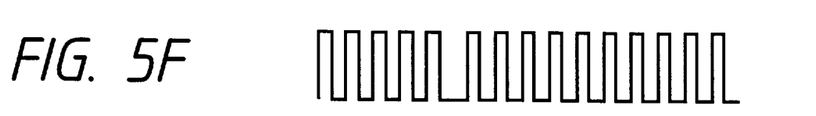

The stepping motor driving device of the present invention used for driving the carriage unit 5 will be described below. FIG. 4 is a block diagram showing the constituting elements of the present invention. The device shown in FIG. 4 includes an MPU 101 for performing motor drive control, a Pulse Wide Modulator (to be referred to as a PWM unit hereinafter) 102 which is connected to an MPU bus, and the frequency and duty of which can be set, an I/O port (output port) 103 which is connected to the MPU bus and generates coded signals for driving stepping motor, a two-phase, unipolar-connected stepping motor 80, and current control transistors 106 for controlling coil currents of the stepping motor 80 in accordance with the outputs from the I/O port 103. The device also includes flywheel diodes 107 for forming current routes when the current control transistors 106 are turned off, diodes 108 for preventing reverse flow of coil currents of the stepping motor 80, a programmable timer unit 109 connected to the MPU bus of the MPU 101, and a ROM 110 that stores a program and necessary data.

In the above-mentioned arrangement, the MPU 101 generates signals A, B, C, and D shown in FIG. 5 for two-phase excitation required for driving the stepping motor 80 from the output port 103. The timer 109 outputs the output change timings of the MPU 101 under the control of the software of the MPU 101. The MPU 101 sets the PWM unit 102 to output predetermined duty pulses in units of excitation phases as in a stepping motor driving table at a constant frequency, e.g., at a frequency of 20 kHz or higher, which is higher than the audible range of a human being. Signals in FIGS. 5E and 5F represent the output examples of the duty pulses. In response to these outputs, the current control transistors 106 are enabled, and supply currents to the stepping motor 80. When the transistors 106 are ON, electric power is stored in the inductances of the coils of the stepping motor 80; when they are OFF, the power is discharged through the flywheel diodes 107. By repeating such operations, currents with values proportional to the two output pulse duties can be supplied to the selected coils of the stepping motor 80.

Figure 6:
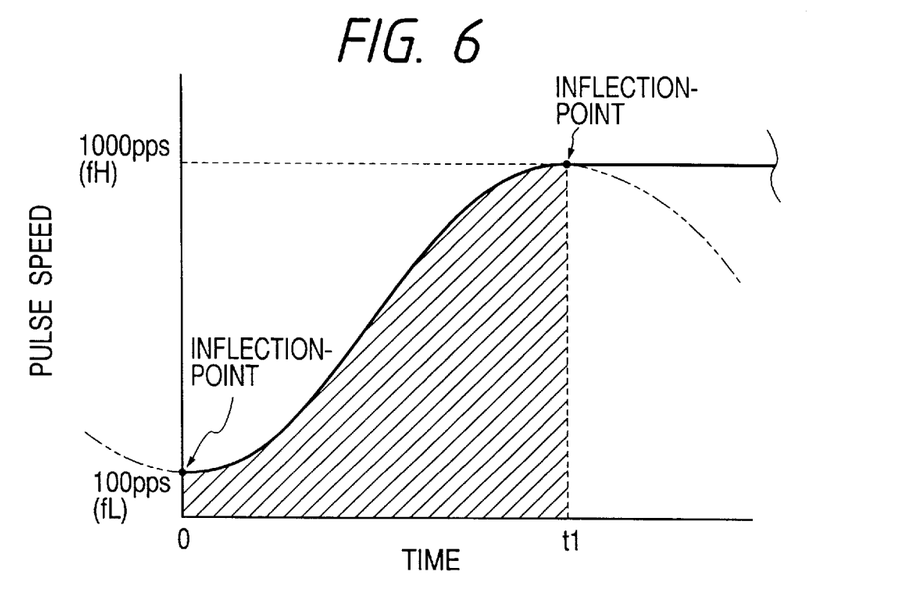
FIG. 6 is a graph showing the first embodiment of a driving curve of the stepping motor shown in FIG. 4.

FIG. 6 is a graph showing the driving curve that represents the speed of the stepping motor 80 at that time. The number of applied pulses in the slew section upon rising is about 25 to 50. In this embodiment, the stepping motor 80 comprises a PM type motor with 96 steps, its start frequency ($f_L$) is about 100 pps, and its predetermined constant-speed frequency ($f_H$) is about 1,000 pps.

An S-shaped curve can effectively suppress vibrations. More specifically, the S-shaped curve is defined by moderate curve portions immediately before the start and before arrival at the constant speed section, and a smooth curve portion connecting them. However, since the S-shaped driving curve is calculated from a higher-order (third-order or higher) equation, sophisticated and time-consuming calculations are required. Furthermore, innumerable curves are available depending on the portions of the curve to be used as the driving curve, how a large number of variables and parameters are set, and the like. Also, calculations and confirmation of such variable, parameters, and the like require much labor.

According to the finding of the present inventors, under such circumstances, inflection points of a higher-order (third-order or higher) equation having two or more inflection points can be used. More specifically, as shown in FIG. 6, one inflection point is set at the start frequency, and another inflection point is set at one predetermined constant-speed frequency. By utilizing the inflection points, moderate curve portions can be formed immediately before the start and before arrival at the constant speed section, and can be connected by a smooth curve portion.

Furthermore, when one inflection point is set at the start frequency, and another inflection point is set at one predetermined constant-speed frequency, the differential formulas of the equation at the start time and the constant-speed frequency arrival time assume a value "0". Variables of these formulas can be calculated. When an equation is formed by eliminating lower-order terms to minimize the variables of the driving curve, the driving curve can be easily obtained by substituting only the start frequency, constant-speed frequency, and the number of ramp-up pulses.

A specific formula that can obtain such driving curve will be described below. More specifically, a general formula of third-order or higher that has two or more inflection points is as follows:

$$f(t) = At^N + Bt^{N-1} + Yt + Z$$

Differentiating this formula, we have:

$$f'(t) = NAt^{N-1} + (N-1)Bt^{N-2} + Y$$

The following conditions are added to this formula.

That is, the formula is simplified by limiting the number of inflection points to 2.

When t=0, the formula has an inflection point.

$$f'(0) = 0$$

When $t = t_1$ at the arrival time of the constant-speed frequency $f_H$, the formula has another inflection point.

$$f'(t_1) = 0$$

Under these conditions, terms after (N−3)th-order in the equation of f'(t) can be eliminated.

$$f'(t) = NAt^{N-1} + (N-1)Bt^{N-2}$$
$$= NAt^{N-2}\left(t + \frac{N-1}{NA}B\right)$$

Since f'(0)=0, $NAt^{N-2}$ is 0.
Since $f'(t_1)=0$, $$\left(t + \frac{N-1}{NA}B\right)$$

is 0.

Hence, from this formula, a simple formula having only two inflection points can be obtained.

Integrating this formula back to the original form yields:

$$f(t) = At^N + Bt^{N-1} + Z$$
$$= At^{N-1}\left(t + \frac{B}{A}\right) + Z$$

Since $f(0) = f_L$ (start frequency), we have:

$Z = f_L$

Letting B/A=−b and A=a, then the driving curve is defined by the following Nth-order specific formula having two inflection points:

$$f(t) = at^{N-1}(t-b) + f_L$$

The variables a and b can be calculated using this Nth-order specific formula, as will be described below.

Note that f(t) is the frequency, and t is time.

This will be explained in the case of a third-order formula (N=3). In this case, the specific formula is described by:

$$f(t) = a \cdot t^2(t-b) + f_L \quad (1)$$

Differentiating this formula gives:

$$f'(t) = 3 \cdot a \cdot t^2 - 2 \cdot a \cdot b \cdot t = (3 \cdot t - 2 \cdot b)a \cdot t \quad (2)$$

If $t_1$ represents the time required until $f_H$ is reached from $f_L$, substituting $t_1$ into formula (1) yields:

$$f(t_1) = a \cdot t_1^2(t_1 - b) + f_L = f_H \quad (3)$$

Since $t_1$ corresponds to the inflection point, substituting $t_1$ into the differential formula yields:

$$f'(t_1) = (3 \cdot t_1 - 2 \cdot b)a \cdot t = 0 \quad (4)$$

From formula (4), $$t_1 = 2 \cdot b/3 \qquad (5)$$

If n represents the number of applied pulses in the through section upon rising, since the area, specific formula (1) forms with the x-axis within the time $t_1$ between $f_L$ and $f_H$, becomes n, the following integral formula can be obtained:

$$n = \int_0^{t1} f(t)dt = a \cdot t_1^4/4 - a \cdot b \cdot t_1^3/3 + f_L \qquad (6)$$

Substituting formula (5) into formulas (3) and (6) respectively gives:

$$ab^3 = -(81/12)(f_H - f_L) \qquad (7)$$

$$n = -(4/81)a \cdot b^4 + (2/3)b \cdot f_L \qquad (8)$$

From formulas (7) and (8), $$b = 3 \cdot n/(f_H + f_L) \qquad (9)$$

Substituting formula (9) into formula (7) yields:

$$a = (f_H - f_L)(f_H + f_L)^3(-1/4 \cdot n^3) \qquad (10)$$

As described above, the variables a and b can be calculated, and the specific formula can be obtained.

From this specific formula, the frequencies of drive pulses can be calculated using, e.g., the Newton's method or the like. Note that the driving curve portion in the ramp-down section is nearly symmetrical to that in the ramp-up section.

The frequencies of drive pulses calculated from the specific formula are pre-stored as data in the ROM 110 shown in FIG. 4. In accordance with the stored data, the MPU 101 generates the signals shown in FIGS. 5A, 5B, 5C and 5D for two-phase excitation required for driving the stepping motor 80 from the output port 103 for predetermined periods of time defined by the first to n-th ramp-up pulses, thereby exciting the predetermined phases of the motor.

With the above-mentioned stepping motor driving system, when an S-shaped driving curve is formed, a curve having two or more inflection points is used, one inflection point is set at the start frequency, another inflection point is set at the predetermined constant-speed frequency, and a specific formula obtained by eliminating lower-order terms of a formula of third-order or higher for calculating that curve is used, so that a driving curve can be easily obtained by substituting only the start or end frequency, constant-speed frequency, and the number of ramp-up or ramp-down pulses.

Furthermore, since a satisfactory solution upon scanning of the carriage can be easily obtained within a short period of time, and vibrations upon scanning of the carriage can be reduced, speed precision can be improved, thus improving print quality.

Since the same vibration characteristics as in the conventional device can be attained by shorter ramp-up pulses than in the conventional device, i.e., within a shorter ramp-up section, the print time can be shortened, and the apparatus size can be reduced.

Second Embodiment

In the above embodiment, a ramp-up driving curve is defined using the third-order specific formula, so that one inflection point is set at the start frequency, and another inflection point is set at the predetermined constant-speed frequency. The start frequency ($f_L$) is set at about 100 pps, and the predetermined constant-speed frequency ($f_H$) is set at about 1,000 pps.

Figure 7:
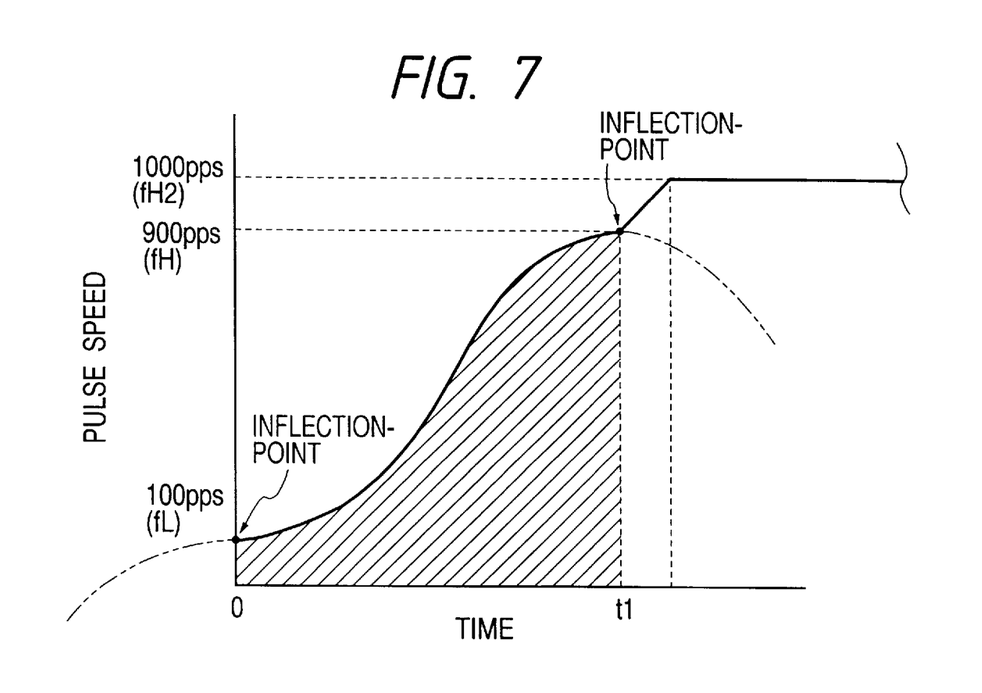
FIG. 7 is a graph showing the second embodiment of a driving curve of the stepping motor shown in FIG. 4.

In the second embodiment, a fourth-order specific formula is used, as shown in FIG. 7, one of the inflection points is set at a predetermined first constant-speed frequency ($f_H$), and a linear driving curve portion may be formed between the first constant-frequency and a predetermined second constant-speed frequency ($f_{H2}$). In this embodiment, the start frequency is about 100 pps, the predetermined first constant-speed frequency ($f_H$) is about 900 pps, and the predetermined second constant-speed frequency ($f_{H2}$) is about 1,000 pps. In this case, the specific formula is described as follows:

$$f(t) = a \cdot t^3(t-b) + f_L \qquad (1)$$

Differentiating this formula (1) gives:

$$f'(t) = 4 \cdot a \cdot t^3 - 3a \cdot b \cdot t^2 = (4 \cdot t - 3 \cdot b)a \cdot t^2 \qquad (2)$$

If $t_1$ represents the time required until $f_H$ is reached from $f_L$, substituting $t_1$ into formula (1) yields:

$$f(t_1) = a \cdot t_1^3(t_1 - b) + f_L = f_H \qquad (3)$$

Since $t_1$ corresponds to the inflection point, substituting $t_1$ into differential formula (2) gives:

$$f'(t_1) = (4 \cdot t_1 - 3 \cdot b)a \cdot t_1^2 = 0 \qquad (4)$$

From formula (4), we have:

$$t_1 = 3 \cdot b/4 \qquad (5)$$

If n represents the number of applied pulses in specific formula (1) forms with the x-axis within the time $t_1$ between $f_L$ and $f_H$, becomes n, the following integral formula can be obtained:

$$n = \int_0^{t1} f(t)dt = a \cdot t_1^5/5 - a \cdot b \cdot t_1^4/4 + f_L \cdot t_1 \qquad (6)$$

Substituting formula (5) into formulas (3) and (6) respectively gives:

$$ab^4 = -(256/27)(f_H - f_L) \qquad (7)$$

$$n = -(164/5120)a \cdot b^5 + (3/4)b \cdot f_L \qquad (8)$$

From formulas (7) and (8), we have:

$$b = 20 \cdot n/(3 \cdot (2f_H + 3f_L)) \qquad (9)$$

Substituting formula (9) into formula (7) yields:

$$a = (f_H - f_L)(2f_H + 3f_L)^4(-3/625 \cdot n^3) \qquad (10)$$

As described above, the variables a and b can be calculated, and the specific formula can be obtained.

From this specific formula, the frequencies of drive pulses can be calculated using, e.g., the Newton's method or the like. About 2 to 5 constant-speed pulses are applied to form a linear driving curve by about 2 to 5 pulses, thus making the motor rise from the predetermined first constant-speed frequency ($f_H$: about 900 pps) to the predetermined second constant-speed frequency ($f_{H2}$: about 1,000 pps).

Note that the driving curve portion in the ramp-down section is nearly symmetrical to that in the ramp-up section. Using the above-mentioned driving curve, the number of conditions for the driving curve that can further reduce vibrations can be increased, and many conditions can be easily coped with. Other arrangements are the same as those in the first embodiment.

Third Embodiment

Figure 8:
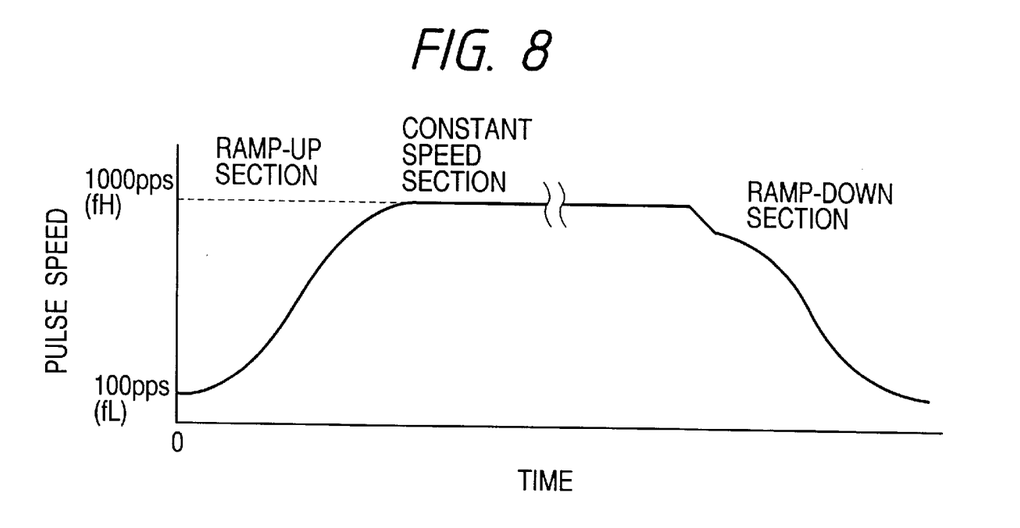
FIG. 8 is a graph showing the third embodiment of a driving curve of the stepping motor shown in FIG. 4.

In the first and second embodiments, the driving curve portion in the ramp-down section, which is nearly symmetrical to the driving curve portion in the ramp-up section, is used. Alternatively, as shown in FIG. 8, the driving curve of the first embodiment may be used as that in the ramp-up section, and the driving curve of the second embodiment may be used as that in the ramp-down section. Using such driving curve, the number of conditions for the driving curve that can further reduce vibrations can be increased, and many conditions can be easily coped with. Other arrangements are the same as those in the first embodiment.

Fourth Embodiment

In the first to third embodiments, both the driving curve portions in the ramp-up and ramp-down sections use those expressed by the above-mentioned specific formula. However, one of these driving curve portions may use another driving curve.

Figure 9:
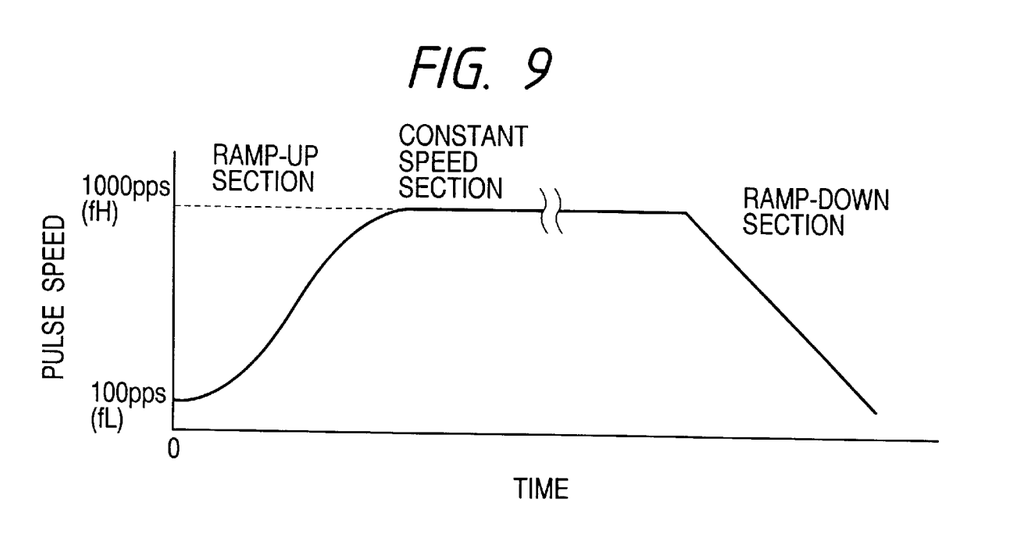
FIG. 9 is a graph showing the fourth embodiment of a driving curve of the stepping motor shown in FIG. 4.

FIG. 9 shows an example of the fourth embodiment in which the driving curve portion in the ramp-up section uses the same driving curve as in the first embodiment, and the driving curve portion in the ramp-down section uses a linear driving curve. Using such driving curve, the number of conditions for the driving curve that can further reduce vibrations can be increased, and many conditions can be easily coped with. Hence, the driving curves to be combined with the driving curves of the present invention includes an exponential curve, parabolic curve, sine curve, and the like in addition to the linear curve. Other arrangements are the same as those in the first embodiment.

The present invention can obtain the following points.

(1) In a recording apparatus which has a carriage that has a recording head and scans, when an S-shaped driving curve is formed, a curve having two or more inflection points is used, one of the inflection points is set at a start frequency (or constant-speed frequency), another inflection point is set at a predetermined constant-speed frequency (or end frequency), and a specific formula obtained by removing lower-order terms of an equation of third order or higher which gives that curve is used, thereby easily obtaining a driving curve by substituting only the start frequency (or end frequency), constant-speed frequency, and the number of ramp-up pulses (or the number of ramp-down pulses).

(2) Since a satisfactory solution upon scanning of the carriage can be easily obtained within a short period of time, and vibrations upon scanning of the carriage can be reduced, speed precision can be improved, thus improving print quality.

(3) If the same vibration characteristics as in the conventional apparatus are allowed, they can be attained by shorter ramp-up pulses, i.e., within a shorter ramp-up section, thus shortening the print time and reducing the apparatus size.

What is claimed is:

1. A stepping motor control system comprising:
   a stepping motor;
   a driving circuit for exciting phases of said stepping motor; and
   a control circuit for transferring data corresponding to predetermined stepping motor driving curve to said driving circuit,
   wherein the driving curve is formed by an Nth-order specific formula having at least two inflection points, said Nth-order specific formula being given by:

$$f(t)=at^{n-1}(t-b)+f_L$$

where f(t) is the frequency, t is time, a and b are variables, and fT is the start or stop frequency,
   said control circuit being constructed to calculate the variables a and b from said specific formula based on a given start or stop frequency, a constant frequency and a rising Pulse to obtain an excellent drive curve from the specific formula.

2. A system according to claim 1, wherein in a ramp-up section of the stepping motor driving curve, one of the inflection points of the stepping motor driving curve is set at a start frequency, and the other inflection point is set at a predetermined frequency.

3. A system according to claim 2, wherein the predetermined frequency at the other inflection point is set to be a predetermined first frequency, and a curve portion extending from the predetermined first frequency to a predetermined second frequency is formed by a linear driving curve.

4. A system according to claim 1, wherein in a ramp-down section of the stepping motor driving curve, one of the inflection points of the stepping motor driving curve is set at a predetermined frequency, and the other inflection point is set at a stop frequency.

5. A system according to claim 1, wherein the Nth-order specific formula is a formula of frequency as a function of time expressed by a predetermined number of higher-order terms and constants.

6. A stepping motor control system for a recording apparatus, comprising:
   a stepping motor serving as a driving source of a driving system of the recording apparatus;
   a driving circuit for exciting phases of said stepping motor; and
   a control circuit for transferring data corresponding to a predetermined stepping motor driving curve to said driving circuit,
   wherein the driving curve is formed by an Nth-order specific formula having at least two inflection points, which formula is given by:

$$f(t)=at^{N-1}(t-b)+f_L$$

where f(t) is the frequency, t is time, a and b are variables, and $f_L$ is the start or stop frequency,
   said control circuit being constructed to calculate the variables a and b from said specific formula based on a given start or stop frequency, a constant frequency and a rising pulse to obtain an excellent drive curve from the specific formula.

* * * * *

UNITED STATES PATENT AND TRADEMARK OFFICE
CERTIFICATE OF CORRECTION

PATENT NO. : 5,889,379
DATED : March 30, 1999
INVENTOR(S) : Haruyuki Yanagi et al.

It is certified that error appears in the above-identified patent and that said Letters Patent is hereby corrected as shown below:

[54] TITLE
"NON-LINER" should read -- NON-LINEAR --.

[56] REFERENCES CITED
Foreign patent Documents
"07245993" should read -- 7-245993 --.

Column 1,
Line 3, "NON-LINER" should read -- NON-LINEAR --.
Line 33, "vibration" should read -- low vibration --.

Column 3,
Line 1, "member P" should read -- members P --.
Line 6, "effects" should read -- operates --.
Line 7, "effect" should read -- operate --.
Line 21, "member P is" should read -- members P are --.
Line 23, "is" should read -- are --.
Line 23, "cam 22" should read -- cam 29 --.
Line 30, "PE sensor 32." should read -- PE (paper edge) sensor 32. --.
Line 32, "pitch" should read -- pinch --.
Line 33, "is" should read -- are --.
Line 34, "pitch" should read -- pinch --.

Column 4,
Line 35, "avoiding" should read -- preventing --.
Line 36, "selectively" should read -- selectively transferring --.
Line 58, "(output" should read -- (input/output --.
Line 60, "stepping" should read -- a stepping --.

Column 5,
Line 40, "variable," should read -- variable, --.
Line 66, "$f^1(t) = At^N + Bt^{N-1} + Yt + Z$" should read -- $f^1(t) = At^N + Bt^{N-1} + \ldots Yt + Z$ --.

Column 6,
Line 3, " $f^1(t) = Nat^{N-1} + (N-1)Bt^{N-2} + Y$" should read
-- $f^1(t) = Nat^{N-1} + (N-1)Bt^{N-2} + \ldots Y$ --.

UNITED STATES PATENT AND TRADEMARK OFFICE
CERTIFICATE OF CORRECTION

PATENT NO. : 5,889,379
DATED : March 30, 1999
INVENTOR(S) : Haruyuki Yanagi et al.

It is certified that error appears in the above-identified patent and that said Letters Patent is hereby corrected as shown below:

Column 8
Line 30, "in specific" should read -- in the through Section upon rising, since the area, specific --.

Column 9,
Line 29, "includes" should read -- include --.

Column 10
Line 2, "predetermined" should read -- a predetermined --.
Line 8, "at$^{n-1}$" should read -- at$^{N-1}$ --.
Line 11, "fT" should read -- $f_L$ --.
Line 15, "Pulse" should read -- pulse --.

Signed and Sealed this

Seventh Day of August, 2001

*Attest:*

NICHOLAS P. GODICI
*Attesting Officer*     *Acting Director of the United States Patent and Trademark Office*